US012596893B2

(12) United States Patent
Miyazawa

(10) Patent No.: US 12,596,893 B2
(45) Date of Patent: Apr. 7, 2026

(54) CARD READER

(71) Applicant: NIDEC INSTRUMENTS CORPORATION, Nagano (JP)

(72) Inventor: Shinya Miyazawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 15 days.

(21) Appl. No.: 18/663,076

(22) Filed: May 14, 2024

(65) Prior Publication Data

US 2024/0386220 A1 Nov. 21, 2024

(30) Foreign Application Priority Data

May 16, 2023 (JP) ................................. 2023-080707

(51) Int. Cl.
 *G06K 7/00* (2006.01)
(52) U.S. Cl.
 CPC .................................. *G06K 7/0026* (2013.01)
(58) Field of Classification Search
 CPC ........................... G06K 7/0026; G06K 7/0013
 See application file for complete search history.

(56) References Cited

U.S. PATENT DOCUMENTS

| | | | |
|---|---|---|---|
| 10,282,568 B2 | 5/2019 | Miyazawa | |
| 2017/0316288 A1* | 11/2017 | Aiyoshi | G06K 13/085 |
| 2018/0341792 A1* | 11/2018 | Miyazawa | G06K 7/0026 |
| 2019/0354730 A1* | 11/2019 | Takahashi | G06K 7/0078 |

* cited by examiner

*Primary Examiner* — Sonji N Johnson
(74) *Attorney, Agent, or Firm* — HAUPTMAN HAM, LLP

(57) ABSTRACT

A card reader includes an IC contact block having IC contact springs, a main body frame and a torsion coil spring which urges the IC contact block. The IC contact block has a card abutting part abutting with a card and a block side spring engaging part with which one end of the torsion coil spring is engaged and is movable between a contact position where the IC contact springs are contacted with the card and a retreated position where the IC contact springs are retreated from the card. The main body frame has a frame side spring engaging part with which the other end of the torsion coil spring is engaged. The torsion coil spring urges the IC contact block toward the retreated position and, when the IC contact block is pushed by the card, the IC contact block is moved from the retreated position against the torsion coil spring.

8 Claims, 5 Drawing Sheets

CARD READER

CROSS REFERENCE TO RELATED APPLICATION

The present invention claims priority under 35 U.S.C. § 119 to Japanese Application No. 2023-080707 filed May 16, 2023, the entire contents of which are incorporated herein by reference.

TECHNICAL FIELD

At least an embodiment of the present invention may relate to a card reader which performs reading of data recorded in a contact type IC card and/or recording of data to a contact type IC card.

BACKGROUND

Conventionally, a card reader has been known which performs reading of data recorded in a contact type IC card and/or recording of data to a contact type IC card (see, for example, Japanese Patent Laid-Open No. 2019-8713 (Patent Literature 1)). A card reader described in Patent Literature 1 includes a main body frame formed with a card moving passage, a plurality of contact springs structured to contact with an external connection terminal of an IC chip formed on a card, an IC contact block which holds a plurality of the contact springs, and a tension coil spring which urges the IC contact block to the main body frame. The IC contact block is capable of moving with respect to the main body frame between a contact position where the IC contact springs are capable of contacting with the external connection terminal of a card and a retreated position where the IC contact springs are retreated so that the IC contact springs do not contact with the external connection terminal.

In the card reader described in Patent Literature 1, the IC contact block is formed with an abutting part with which an end face on a rear side of a card moved in a card moving passage toward a rear side of the card reader is abutted. When the IC contact block is pushed toward a rear side by a card which is abutted with a card abutting face of the abutting part, the IC contact block is moved toward the contact position from the retreated position. The IC contact block which is moved toward the contact position from the retreated position is moved toward a card in a thickness direction of the card as the IC contact block is moved toward the rear side. The tension coil spring urges the IC contact block toward the retreated position. The tension coil spring is disposed on a front side with respect to the IC contact block. The tension coil spring is disposed so that a moving direction of a card moving in the card moving passage and a longitudinal direction of the tension coil spring are coincided with each other.

In the card reader described in Patent Literature 1, the tension coil spring which urges the IC contact block toward the retreated position is disposed on the front side of the IC contact block which is one side in a moving direction of a card, and the tension coil spring is disposed so that the moving direction of the card and a longitudinal direction of the tension coil spring are coincided with each other. Therefore, in the card reader described in Patent Literature 1, a size of the card reader may increase in the moving direction of a card.

SUMMARY

In view of the problem described above, at least an embodiment of the present invention may advantageously provide a card reader in which an IC contact block is moved from a retreated position to a contact position by a card which is abutted with a card abutting face of the IC contact block and, even when a spring member which urges the IC contact block toward the retreated position is provided, a size of the card reader is capable of being reduced in a moving direction of the card.

According to at least an embodiment of the present invention, there may be provided a card reader including a plurality of IC contact springs structured to contact with an external connection terminal of an IC chip formed in a card, an IC contact block which holds a plurality of the IC contact springs, a main body frame in which a card moving passage for moving the card is formed, and a torsion coil spring which urges the IC contact block to the main body frame. When one side in a moving direction of the card which is linearly moved in the card moving passage is referred to as a rear side, and one side in a thickness direction of the card which is linearly moved in the card moving passage is referred to as a first direction side, the IC contact block is provided with a card abutting part which is formed with a card abutting face for abutting with an end face on the rear side of the card, and a block side spring engaging part with which one end part of the torsion coil spring is engaged. The IC contact block is movable with respect to the main body frame between a contact position where the IC contact springs are capable of contacting with the external connection terminal and a retreated position where the IC contact springs are retreated to a position at which the IC contact springs are not contacted with the external connection terminal. The main body frame is provided with a frame side spring engaging part with which the other end part of the torsion coil spring is engaged, the torsion coil spring urges the IC contact block toward the retreated position and, when the IC contact block is pushed toward the rear side by the card which is abutted with the card abutting face, the IC contact block is moved from the retreated position toward the contact position, and the IC contact block moved toward the contact position from the retreated position is moved toward the first direction side as moving toward the rear side.

In the card reader in this embodiment, a spring member which urges the IC contact block toward the retreated position is a torsion coil spring. Therefore, according to this embodiment, in comparison with a case that a spring member which urges the IC contact block toward the retreated position is, for example, a tension coil spring which is disposed so that a front and rear direction and its longitudinal direction are coincided with each other, a size of the card reader can be reduced in the front and rear direction. In other words, in this embodiment, even when a spring member for urging the IC contact block toward the retreated position is provided, a size in the front and rear direction of the card reader can be reduced.

In this embodiment, for example, the main body frame is formed with a cam groove for guiding the IC contact block between the contact position and the retreated position, and the IC contact block is provided with a cam pin which is engaged with the cam groove and guides the IC contact block between the contact position and the retreated position.

In this embodiment, it is preferable that a shape of the cam groove is a circular arc shape when viewed in a width direction of the card which is perpendicular to the moving direction of the card and the thickness direction of the card. In this embodiment, the IC contact block is urged by a torsion coil spring and thus, according to this structure, the IC contact block is easily urged in a direction along the cam groove by the torsion coil spring. Therefore, the IC contact block 9 can be urged without difficulty.

In this embodiment, it is preferable that the IC contact block is provided with a first cam pin and a second cam pin as the cam pin, the first cam pin and the second cam pin are disposed in a separated state from each other in the moving direction of the card, the main body frame is formed with, as the cam groove, a first cam groove with which the first cam pin is engaged and a second cam groove with which the second cam pin is engaged, the torsion coil spring is disposed between the first cam groove and the second cam groove in the moving direction of the card, and the block side spring engaging part is disposed between the first cam pin and the second cam pin in the moving direction of the card.

According to this structure, in comparison with a case that a torsion coil spring is disposed on a front side or a rear side with respect to the first cam groove and the second cam groove, and a block side spring engaging part is disposed on a front side or a rear side with respect to the first cam pin and the second cam pin, a size of the card reader can be reduced in a moving direction of a card. Therefore, a size of the card reader can be further reduced in the moving direction of a card. Further, according to this structure, the torsion coil spring is disposed between the first cam groove and the second cam groove in the moving direction of a card, and the block side spring engaging part is disposed between the first cam pin and the second cam pin in the moving direction of a card and thus, the IC contact block urged by the torsion coil spring is easily and smoothly moved between the retreated position and the contact position.

In this embodiment, it is preferable that a shape of the first cam groove and a shape of the second cam groove when viewed in a width direction of the card which is perpendicular to the moving direction of the card and the thickness direction of the card are circular arc shapes which are the same shapes as each other. In this embodiment, the IC contact block is urged by a torsion coil spring and thus, according to this structure, the IC contact block is easily urged in a direction along the first cam groove and the second cam groove by the torsion coil spring. Therefore, the IC contact block can be urged without difficulty.

In this embodiment, it may be structured that, when a direction perpendicular to a moving direction of a card and a thickness direction of the card is referred to as a width direction of the card, the card reader includes two fixed pins which are attached to the main body frame, and two link members which are turnable with the width direction of the card as an axial direction of turning and with the fixed pin as a turning center. The two fixed pins are disposed in a separated state in the moving direction of the card, the two link members are disposed in a separated state in the moving direction of the card, the IC contact block is provided with two link pins which are turnably held by the link member or fixed to the link member. The two fixed pins, the two link members and the two link pins structure a parallel link mechanism for guiding the IC contact block between the contact position and the retreated position, the torsion coil spring is disposed between the two fixed pins in the moving direction of the card, and the block side spring engaging part is disposed between the two link pins in the moving direction of the card.

In this case, in comparison with a case that the torsion coil spring is disposed on a front side or a rear side with respect to the two fixed pins, and the block side spring engaging part is disposed on a front side or a rear side with respect to the two link pins, a size of the card reader can be reduced in the moving direction of a card. Therefore, a size of the card reader can be further reduced in the moving direction of a card. Further, in this case, the torsion coil spring is disposed between the two fixed pins in the moving direction of a card, and the block side spring engaging part is disposed between the two link pins in the moving direction of a card and thus, the IC contact block which is urged by the torsion coil spring is easily and smoothly moved between the retreated position and the contact position.

In this embodiment, it is preferable that the card reader includes, as a plurality of the IC contact springs, a plurality of first IC contact springs disposed at the same positions in the moving direction of the card, and a plurality of second IC contact springs which are disposed at the same positions in the moving direction of the card and disposed on the rear side with respect to the first IC contact springs, and the block side spring engaging part is disposed in the moving direction of the card between a first contact part of the first IC contact spring which is a portion to be contacted with the external connection terminal and a second contact part of the second IC contact spring which is a portion to be contacted with the external connection terminal. According to this structure, the torsion coil spring can be arranged in a well-balanced manner in the moving direction of a card with respect to a plurality of the first IC contact springs and a plurality of the second IC contact springs.

Effects of the Invention

As described above, in accordance with an embodiment of the invention, in a card reader in which an IC contact block is moved from a retreated position to a contact position by a card which is abutted with a card abutting face of the IC contact block, even when a spring member which urges the IC contact block toward the retreated position is provided, a size of the card reader can be reduced in a moving direction of the card.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings.

(Schematic Structure of Card Reader)

Figure 1:
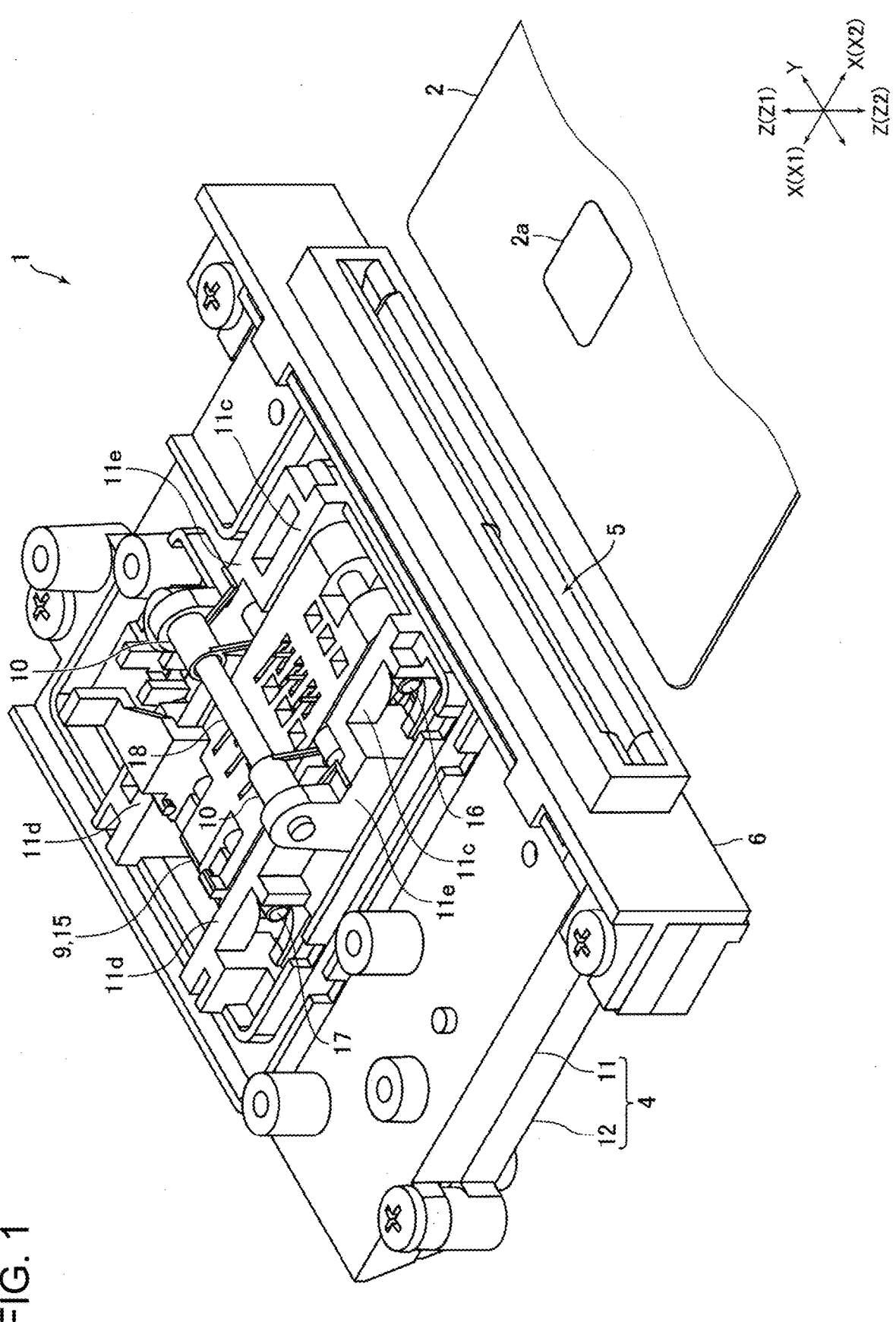
FIG. 1 is a perspective view showing a card reader in accordance with an embodiment of the present invention.
Figure 2A:
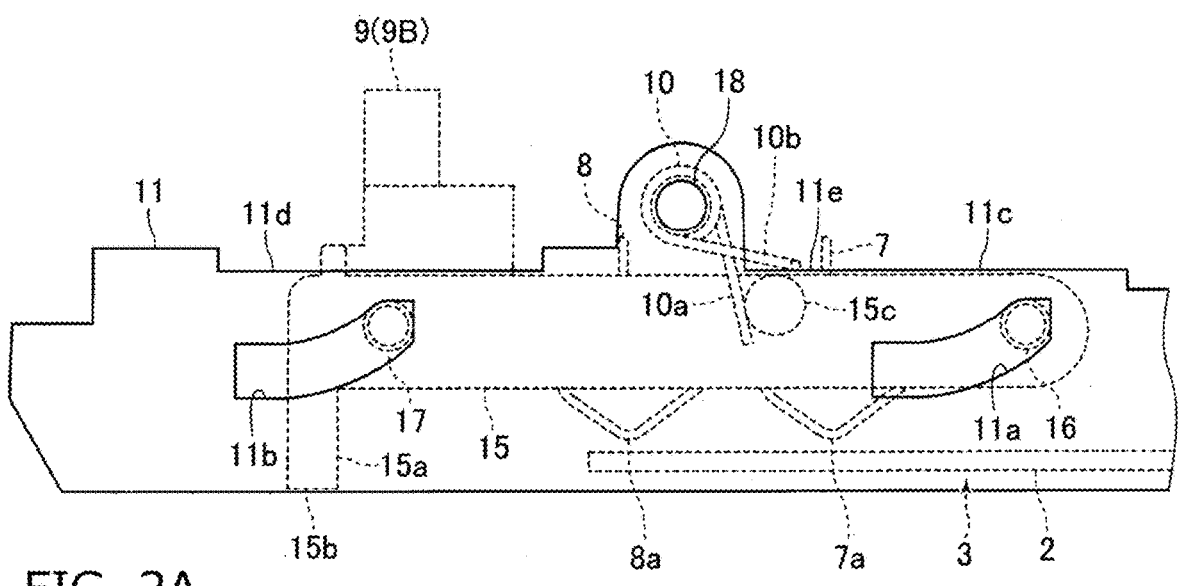
FIGS. 2A and 2B are side views for explaining an operation of an IC contact block shown in FIG. 1.
Figure 2B:
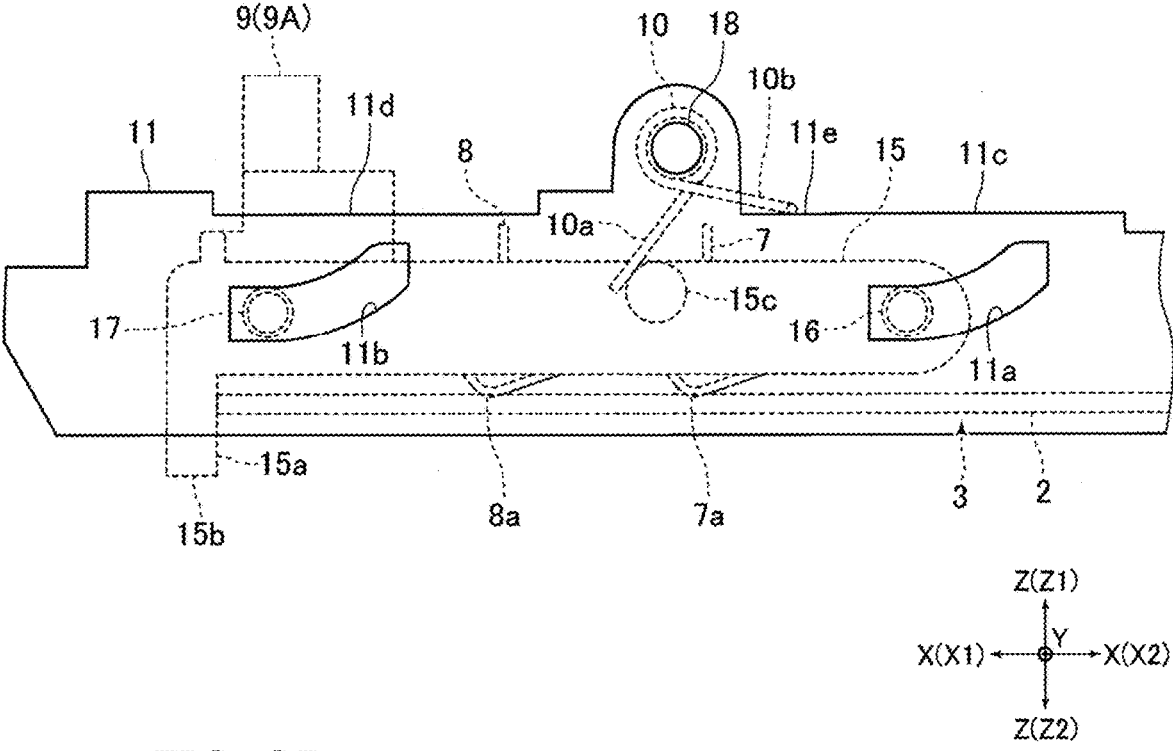

FIG. 1 is a perspective view showing a card reader 1 in accordance with an embodiment of the present invention. FIGS. 2A and 2B are side views for explaining an operation of an IC contact block 9 shown in FIG. 1.

A card reader 1 in this embodiment is a device which performs reading of data recorded in a card 2 and/or recording of data to a card 2. Specifically, the card reader 1 is a so-called dip type card reader in which insertion of a card 2 into the card reader 1 and taking-out of the card 2 from the card reader 1 are manually performed to make reading and recording of data. The card reader 1 is mounted and used in a predetermined host apparatus. A card 2 is, for example, a card made of vinyl chloride whose thickness is about 0.7-0.8 mm. The card 2 is formed in a rectangular shape. An IC chip is built in the card 2, and one face of the card 2 is formed with an external connection terminal 2a of the IC chip. In accordance with an embodiment of the present invention, a card 2 may be a metal card.

The card reader 1 includes a main body frame 4 formed with a card moving passage 3 (see FIGS. 2A and 2B) where a card 2 is moved, a bezel 6 formed with an insertion port 5 for the card 2, a plurality of IC contact springs 7 and 8 structured to contact with the external connection terminal 2a of the card 2, an IC contact block 9 which holds a plurality of the IC contact springs 7 and 8, and torsion coil springs 10 which urge the IC contact block 9 to the main body frame 4. In other words, the card reader 1 is a contact type IC card reader.

In this embodiment, a card 2 which is manually operated is linearly moved in the "X" direction in FIG. 1 and the like. In other words, the "X" direction is a moving direction of a card 2 which is linearly moved in the card moving passage 3. A card 2 is inserted to the "X1" direction side in FIG. 1 which is one side in a moving direction of the card 2, and the card 2 is pulled out to the "X2" direction side in FIG. 1 which is the other side in the moving direction of the card 2. Further, the "Z" direction in FIG. 1 and the like which is perpendicular to the "X" direction is a thickness direction of the card 2 which is linearly moved in the card moving passage 3, and the "Y" direction in FIG. 1 and the like perpendicular to the "X" direction and the "Z" direction is a width direction (short width direction) of the card 2 which is linearly moved in the card moving passage 3.

In the following descriptions, for convenience, the "X" direction is referred to as a front and rear direction, the "Y" direction is referred to as a right and left direction, and the "Z" direction is referred to as an upper and lower direction. Further, the "X1" direction side which is an inserting direction side of a card 2 to the card reader 1 is referred to as a "rear" side, and the "X2" direction side which is the opposite side is referred to as a "front" side. Further, in the following descriptions, the "Z1" direction side in FIG. 1 and the like which is one side in the upper and lower direction is referred to as an "upper" side, and the "Z2" direction side in FIG. 1 and the like which is the opposite side is referred to as a "lower" side. A lower side ("Z2" direction side) in this embodiment is a first direction side which is one side in a thickness direction of a card 2 which is linearly moved in the card moving passage 3.

The main body frame 4 is structured of an upper frame 11 and a lower frame 12 which are divided in the upper and lower direction. The upper frame 11 and the lower frame 12 are formed of resin. The upper frame 11 structures an upper side portion of the main body frame 4, and the lower frame 12 structures a lower side portion of the main body frame 4. The card moving passage 3 is formed between the upper frame 11 and the lower frame 12. The upper frame 11 is formed with an opening part in which a part of the IC contact block 9 is disposed. The opening part is penetrated through the upper frame 11 in the upper and lower direction and is connected with the card moving passage 3. The bezel 6 is fixed to a front end of the main body frame 4.

The IC contact block 9 is movable with respect to the main body frame 4 between a contact position 9A (see FIG. 2B) where the IC contact springs 7 and 8 are capable of contacting with an external connection terminal 2a of a card 2 and a retreated position 9B (see FIG. 2A) which is a position where the IC contact springs 7 and 8 are retreated and do not contact with the external connection terminal 2a. Next, structures of the IC contact block 9 and peripheral portions of the IC contact block 9 will be described below.

(Structures of IC Contact Block and Peripheral Portions of IC Contact Block)

Figure 3:
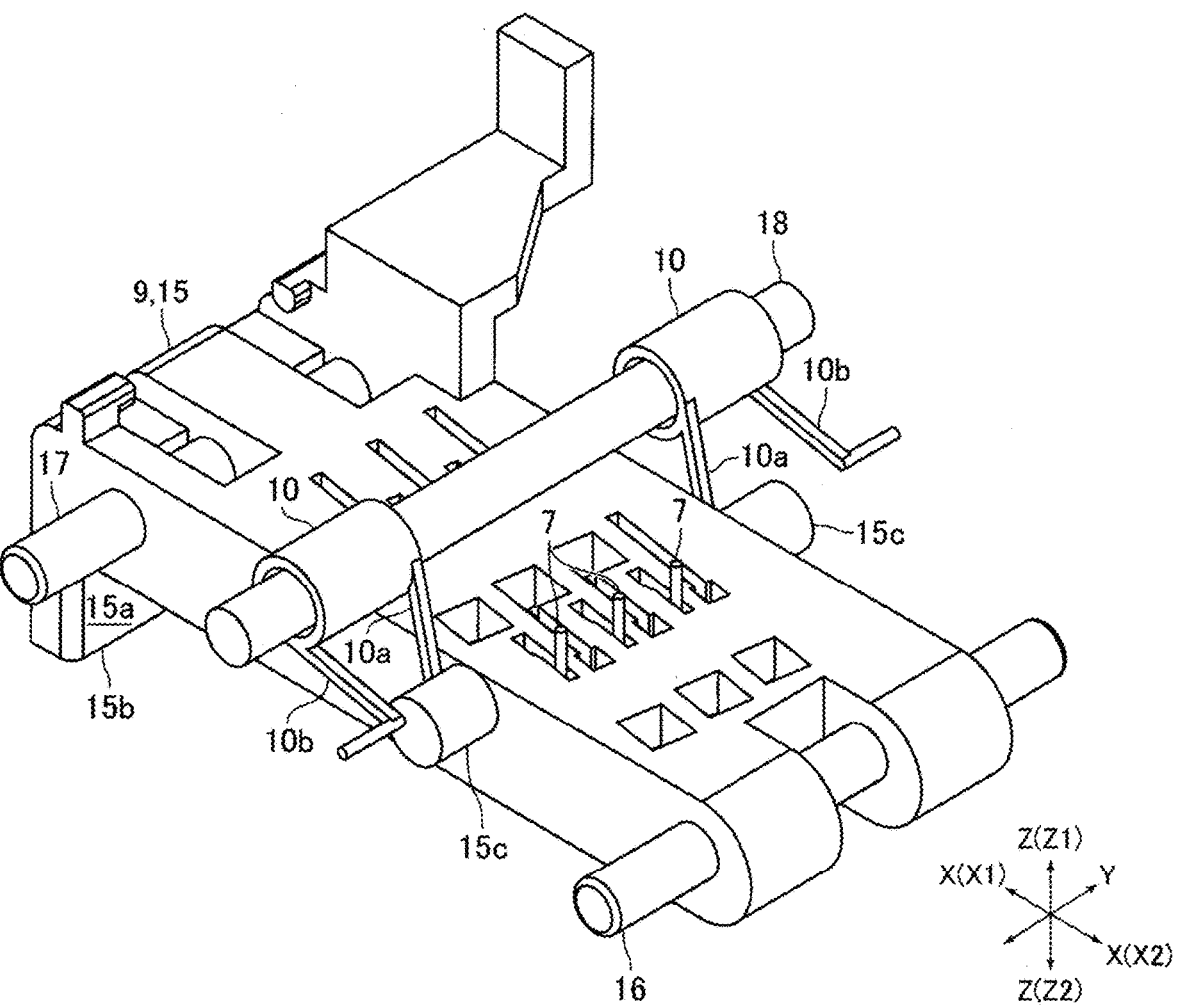
FIG. 3 is a perspective view showing IC contact springs, an IC contact block, torsion coil springs and the like shown in FIG. 1.
Figure 4:
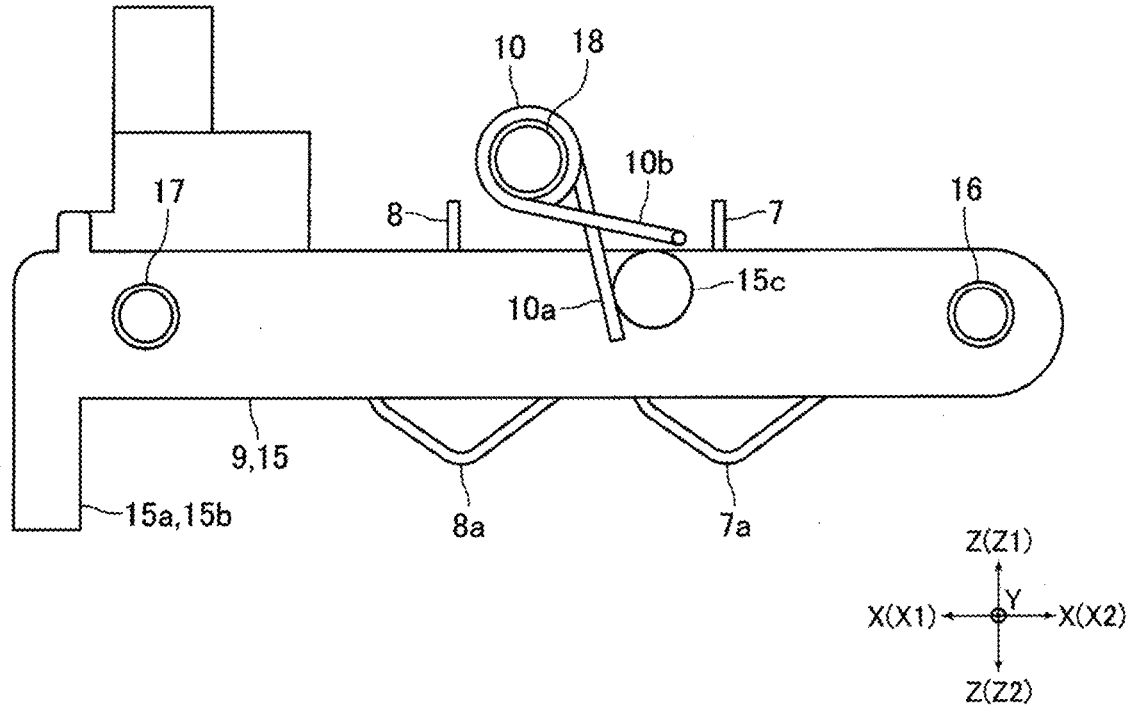
FIG. 4 is a side view showing the IC contact springs, the IC contact block, the torsion coil spring and the like shown in FIG. 3.

FIG. 3 is a perspective view showing the IC contact springs 7 and 8, the IC contact block 9, the torsion coil springs 10 and the like shown in FIG. 1. FIG. 4 is a side view showing the IC contact springs 7 and 8, the IC contact block 9, the torsion coil springs 10 and the like shown in FIG. 3.

As described above, the card reader 1 includes a plurality of the IC contact springs 7 and 8. Specifically, the card reader 1 includes a plurality of the IC contact springs 7 disposed at the same position in the front and rear direction, and a plurality of the IC contact springs 8 which are disposed at the same position in the front and rear direction and are disposed on a rear side with respect to the IC contact springs 7. A plurality of the IC contact springs 7 is disposed in a separated state from each other in the right and left direction, and a plurality of the IC contact springs 8 is disposed in a separated state from each other in the right and left direction. Upper end side portions of the IC contact springs 7 and 8 are connected with a flexible printed board (not shown). The IC contact springs 7 in this embodiment are a first IC contact spring, and the IC contact springs 8 are a second IC contact spring.

The torsion coil spring 10 is disposed on both of outer sides in the right and left direction with respect to the IC contact block 9. In other words, the card reader 1 includes two torsion coil springs 10. The torsion coil spring 10 is provided with two arm parts 10a and 10b. One end part of the torsion coil spring 10 is engaged with the IC contact block 9, and the other end part of the torsion coil spring 10 is engaged with the main body frame 4. Specifically, a tip end part of the arm part 10a which structures one end part of the torsion coil spring 10 is engaged with the IC contact block 9, and a tip end part of the arm part 10b which structures the other end part of the torsion coil spring 10 is engaged with the main body frame 4.

The IC contact block 9 is provided with a block main body 15 which holds a plurality of the IC contact springs 7 and 8. Further, the IC contact block 9 is provided with a plurality of cam pins 16 and 17 which guide the IC contact block 9 between the contact position 9A and the retreated position 9B. The IC contact block 9 in this embodiment is provided with two cam pins 16 and 17. The cam pin 16 in this embodiment is a first cam pin, and the cam pin 17 is a second cam pin.

The block main body 15 is formed in a substantially flat rectangular solid block shape whose thickness in the upper and lower direction is thin. In the block main body 15, the IC contact springs 7 and 8 are disposed so as to face the card moving passage 3 from an upper side. A front end part of the block main body 15 is formed with an insertion hole through which the cam pin 16 is passed, and a rear end part of the block main body 15 is formed with an insertion hole through which the cam pin 17 is passed. The insertion hole is a round hole penetrating through the block main body 15 in the right and left direction.

The block main body 15 is provided with a card abutting part 15*b* formed with a card abutting face 15*a* which is structured to abut with a rear side end face (rear end face) of a card 2 inserted into the card reader 1, and a spring engaging projection 15*c* as a block side spring engaging part with which one end part of the torsion coil spring 10 is engaged. The card abutting part 15*b* is protruded toward a lower side from a rear end part of the block main body 15. A front face of the card abutting part 15*b* is the card abutting face 15*a*. The card abutting face 15*a* is a flat face perpendicular to the front and rear direction. A part of the card abutting face 15*a* is disposed in an inside of the card moving passage 3.

The spring engaging projection 15*c* is formed in a columnar shape. The spring engaging projections 15*c* are protruded toward outer sides in the right and left direction from side faces in the right and left direction of the block main body 15. In other words, the block main body 15 is provided with two spring engaging projections 15*c*. The spring engaging projection 15*c* is disposed on a slightly front side with respect to a center in the front and rear direction of the block main body 15. The two spring engaging projections 15*c* are disposed at the same position in the front and rear direction. A tip end part of the arm part 10*a* is contacted with an outer peripheral face of the spring engaging projection 15*c* from a rear side.

The cam pins 16 and 17 are separately formed from the block main body 15. The cam pins 16 and 17 are formed in a long and thin columnar shape. The cam pins 16 and 17 are disposed so that the axial directions of the cam pins 16 and 17 and the right and left direction are coincided with each other. Further, the cam pin 16 and the cam pin 17 are disposed in a separated state in the front and rear direction. The cam pin 16 is attached to a front end part of the block main body 15, and the cam pin 17 is attached to a rear end part of the block main body 15. Both end parts in the right and left direction of the cam pins 16 and 17 are protruded from the block main body 15 to outer sides in the right and left direction. In accordance with an embodiment of the present invention, the cam pins 16 and 17 may be fixed to the block main body 15, or may be turnable in the block main body 15.

The upper frame 11 is formed with cam grooves 11*a* and 11*b* for guiding the IC contact block 9 between the contact position 9A and the retreated position 9B. The cam groove 11*a* is formed in cam groove forming parts 11*c* which are disposed on both sides in the right and left direction with respect to the block main body 15 and is disposed on both sides in the right and left direction with respect to the block main body 15. The cam groove 11*b* is formed in cam groove forming parts 11*d* which are disposed on both outer sides in the right and left direction with respect to the block main body 15 and is disposed on both outer sides in the right and left direction with respect to the block main body 15.

The cam groove 11*a* penetrates through the cam groove forming part 11*c* in the right and left direction. The cam groove 11*b* penetrates through the cam groove forming part 11*d* in the right and left direction. Shapes of the cam grooves 11*a* and 11*b* are a circular arc shape when viewed in the right and left direction. The cam groove 11*a* and the cam groove 11*b* are formed in the same shape as each other. In other words, the shapes of the cam grooves 11*a* and 11*b* are the same circular arc shape when viewed in the right and left direction. The cam groove 11*a* and the cam groove 11*b* are disposed at the same position as each other in the upper and lower direction. When viewed in the right and left direction, tangential directions of lower end parts of the cam grooves 11*a* and 11*b* formed in a circular arc shape are in parallel with the front and rear direction.

The cam grooves 11*a* are engaged with end parts of the cam pin 16 which is protruded to outer sides in the right and left direction with respect to the block main body 15, and the cam grooves 11*b* are engaged with end parts of the cam pin 17 which is protruded to outer sides in the right and left direction with respect to the block main body 15. Specifically, the end parts of the cam pin 16 protruded to outer sides in the right and left direction from the block main body 15 are inserted into the cam grooves 11*a*, and the end parts of the cam pin 17 protruded to outer sides in the right and left direction from the block main body 15 are inserted into the cam grooves 11*b*. The IC contact block 9 is guided between the contact position 9A and the retreated position 9B by the cam pins 16 and 17 and the cam grooves 11*a* and 11*b*. The cam groove 11*a* in this embodiment is a first cam groove, and the cam groove 11*b* is a second cam groove.

The upper frame 11 is attached with a spring holding pin 18 which is inserted into inner peripheral sides of the two torsion coil springs 10. The spring holding pin 18 is formed in a long and thin columnar shape. The spring holding pin 18 is disposed so that an axial direction of the spring holding pin 18 and the right and left direction are coincided with each other. The spring holding pin 18 is disposed on an upper side with respect to the IC contact block 9. The two torsion coil springs 10 into which the spring holding pin 18 is inserted are held by the main body frame 4 through the spring holding pin 18. In other words, the two torsion coil springs 10 are attached to the main body frame 4 through the spring holding pin 18.

The upper frame 11 is provided with a spring engaging part 11*e* as a frame side spring engaging part with which the other end part of the torsion coil spring 10 is engaged. The spring engaging part 11*e* is disposed on both outer sides with respect to the block main body 15 in the right and left direction. In other words, the upper frame 11 is provided with two spring engaging parts 11*c*. An upper face of the spring engaging part 11*e* is a flat face perpendicular to the upper and lower direction. A tip end part of the arm part 10*b* is contacted with an upper face of the spring engaging part 11*e* from an upper side.

The torsion coil spring 10 is disposed between the cam groove 11*a* and the cam groove 11*b* in the front and rear direction. Further, the torsion coil spring 10 is disposed between the cam pin 16 and the cam pin 17 in the front and rear direction. The spring engaging projection 15*c* is disposed between the cam groove 11*a* and the cam groove 11*b* in the front and rear direction and is disposed between the cam pin 16 and the cam pin 17. Further, the spring engaging projection 15*c* is disposed in the front and rear direction between a first contact part 7*a* (see FIGS. 2A and 2B) of the IC contact spring 7, which is a portion for contacting with an external connection terminal 2*a* of a card 2, and a second contact part 8*a* (see FIGS. 2A and 2B) of the IC contact spring 8 which is a portion for contacting with the external connection terminal 2*a* of the card 2.

The IC contact block 9 is urged toward the retreated position 9B by the torsion coil spring 10. In other words, the torsion coil spring 10 urges the IC contact block 9 toward the retreated position 9B. The IC contact block 9 disposed at the retreated position 9B is disposed on a front and upper side with respect to the IC contact block 9 which is disposed at the contact position 9A. When a card 2 is not inserted into the card reader 1, the IC contact block 9 is arranged at the retreated position 9B by an urging force of the torsion coil spring 10.

When a card 2 is inserted into the card reader 1, a rear end face of the card 2 which is moved in the card moving passage 3 toward a rear side is abutted with the card abutting face 15a. When the card abutting part 15b is pushed toward a rear side by the card 2 which is abutted with the card abutting face 15a, the IC contact block 9 is moved from the retreated position 9B to the contact position 9A. The IC contact block 9 which is moved from the retreated position 9B to the contact position 9A is moved toward a lower side as going toward a rear side.

When the IC contact block 9 is reached the contact position 9A, the IC contact springs 7 and 8 are contacted with the external connection terminal 2a of the card 2 at a predetermined contact pressure, and reading of data recorded in the card 2 and/or recording of data to the card 2 are performed. Further, when the card 2 inserted into the card reader 1 is pulled out, the IC contact block 9 located at the contact position 9A is moved to the retreated position 9B by an urging force of the torsion coil spring 10.

In this embodiment, when the IC contact block 9 is moved between the contact position 9A and the retreated position 9B, a locus of a contact point where an outer peripheral face of the spring engaging projection 15c and a tip end part of the arm part 10a (in other words, one end part of the torsion coil spring 10) are contacted with each other is a substantially circular arc shape when viewed in the right and left direction. A curvature radius of the locus when viewed in the right and left direction is substantially equal to curvature radii of the cam grooves 11a and 11b when viewed in the right and left direction.

(Principal Effects in this Embodiment)

As described above, in this embodiment, the spring member which urges the IC contact block 9 toward the retreated position 9B is the torsion coil spring 10. Therefore, according to this embodiment, in comparison with a case that a spring member which urges the IC contact block 9 toward the retreated position 9B is, for example, a tension coil spring which is disposed so that the front and rear direction and its longitudinal direction are coincided with each other, a size of the card reader 1 can be reduced in the front and rear direction. In other words, in this embodiment, even when a spring member is provided for urging the IC contact block 9 toward the retreated position 9B, a size in the front and rear direction of the card reader 1 can be reduced.

In this embodiment, the shapes of the cam grooves 11a and 11b when viewed in the right and left direction are formed in a circular arc shape. Further, in this embodiment, the IC contact block 9 is urged by the torsion coil spring 10. Therefore, according to this embodiment, the IC contact block 9 is easily urged in a direction along the cam grooves 11a and 11b by the torsion coil spring 10. Therefore, in this embodiment, the IC contact block 9 can be urged without difficulty.

In this embodiment, the torsion coil spring 10 and the spring engaging projection 15c are disposed in the front and rear direction between the cam groove 11a and the cam groove 11b and is disposed between the cam pin 16 and the cam pin 17. Therefore, according to this embodiment, in comparison with a case that the torsion coil spring 10 and the spring engaging projection 15c are disposed on a front side with respect to the cam groove 11a and the cam pin 16, or disposed on a rear side with respect to the cam groove 11b and the cam pin 17, a size in the front and rear direction of the card reader 1 can be reduced. Therefore, in this embodiment, a size in the front and rear direction of the card reader 1 can be further reduced.

Further, in this embodiment, the torsion coil spring 10 and the spring engaging projection 15c are disposed in the front and rear direction between the cam groove 11a and the cam groove 11b and are disposed between the cam pin 16 and the cam pin 17. Therefore, the IC contact block 9 urged by the torsion coil spring 10 is easily and smoothly moved between the retreated position 9B and the contact position 9A. Further, in this embodiment, the spring engaging projection 15c is disposed in the front and rear direction between the first contact part 7a and the second contact part 8a and thus, the torsion coil spring 10 can be arranged in a well-balanced manner in the front and rear direction with respect to a plurality of the IC contact springs 7 and a plurality of the IC contact springs 8.

Figure 5A:
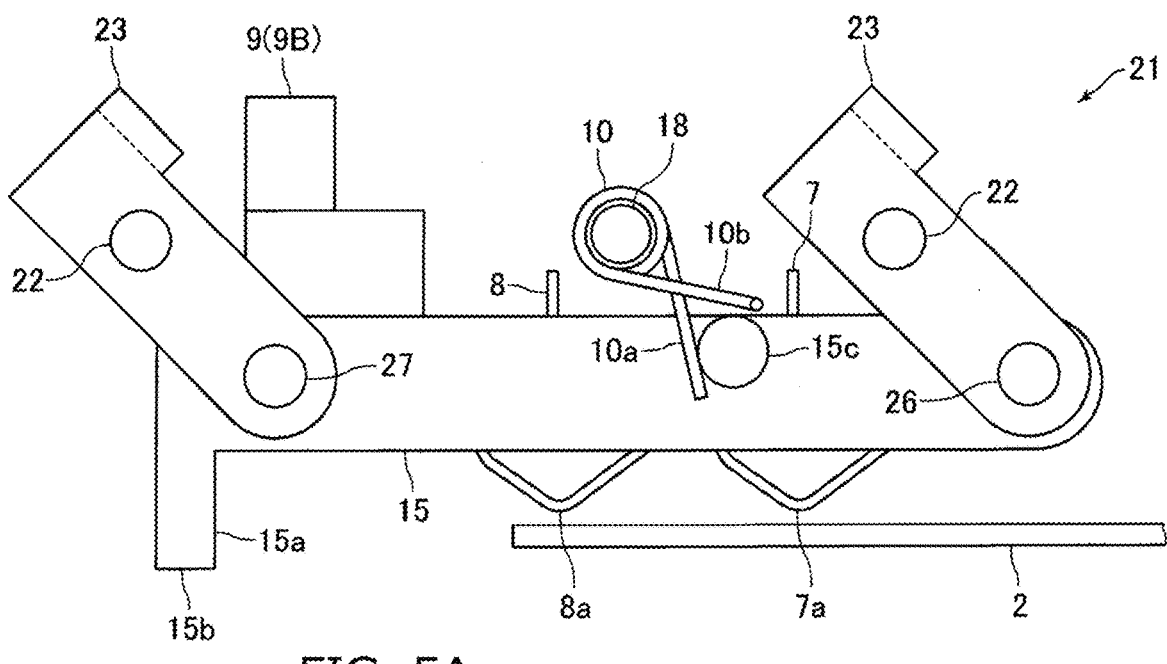
FIGS. 5A and 5B are side views showing structures of an IC contact block and the like in accordance with another embodiment of the present invention.
Figure 5B:
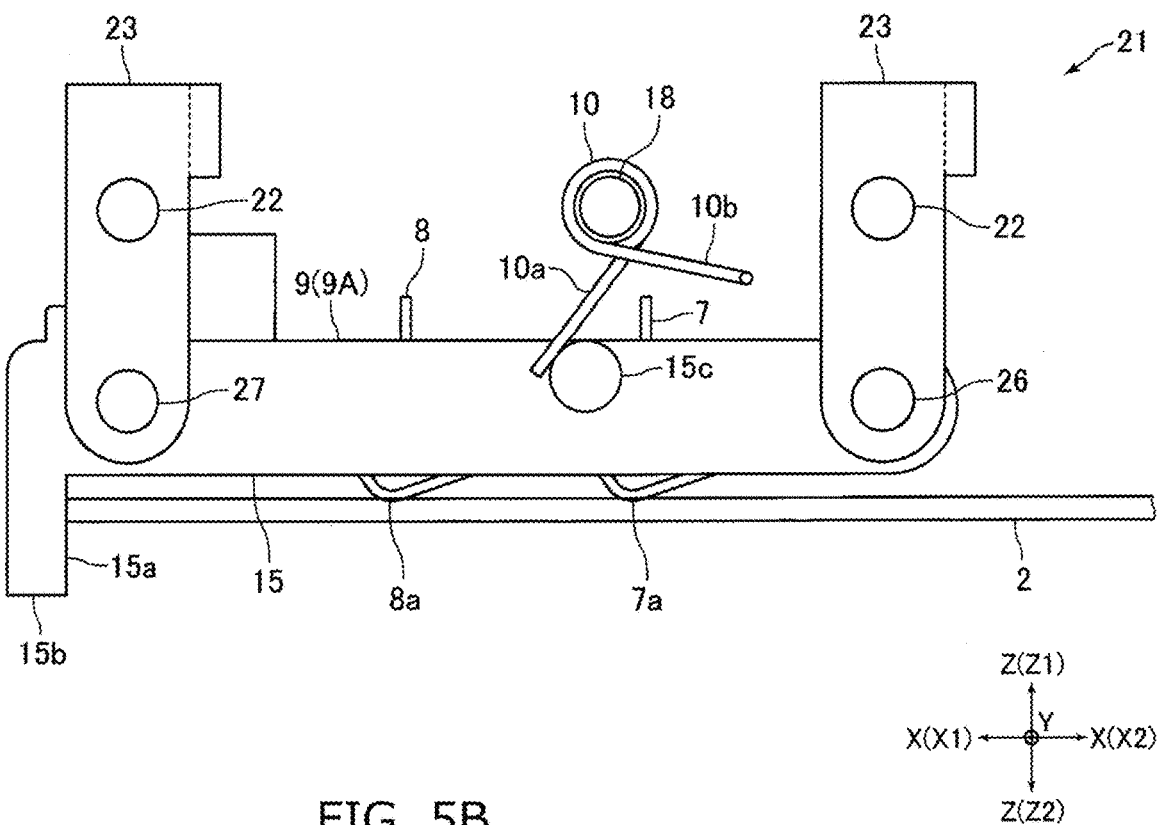

Modified Embodiment of IC Contact Block and Peripheral Portions of IC Contact Block FIGS. 5A and 5B are side views showing structures of an IC contact block 9 and the like in accordance with another embodiment of the present invention. In FIGS. 5A and 5B, the same reference signs are used in the same structures in the embodiment described above.

In the embodiment described above, the IC contact block 9 is guided between the contact position 9A and the retreated position 9B by the cam grooves 11a and 11b and the cam pins 16 and 17. However, as shown in FIGS. 5A and 5B, the IC contact block 9 may be guided between the contact position 9A and the retreated position 9B by a parallel link mechanism 21. In this modified embodiment, the card reader 1 includes two fixed pins 22 attached to an upper frame 11 and two link members 23 which are turnable with the right and left direction as an axial direction of turning and with the fixed pins 22 as a turning center.

The two fixed pins 22 are disposed in a separated state with a distance therebetween in the front and rear direction, and the two link members 23 are disposed in a separated state with a distance therebetween in the front and rear direction. The two fixed pins 22 are disposed at the same position as each other in the upper and lower direction. The fixed pin 22 is, for example, turnably held by the upper frame 11. The link member 23 is, for example, turnably held by the fixed pin 22. The IC contact block 9 is provided with two link pins 26 and 27 which are turnably held by the link members 23. The link pin 26 is held by a front end part of a block main body 15, and the link pin 27 is held by a rear end part of the block main body 15. The parallel link mechanism 21 is structured of the two fixed pins 22, the two link members 23 and the two link pins 26 and 27.

The block main body 15 is formed with insertion holes into which the link pins 26 and 27 are inserted. Both end parts in the right and left direction of the link pins 26 and 27 inserted into the insertion holes are protruded from the block main body 15 to outer sides in the right and left direction, and both end parts of the link pins 26 and 27 protruded from the block main body 15 to outer sides in the right and left direction are turnably held by the link members 23. The link pins 26 and 27 are, for example, turnable with respect to the block main body 15. In accordance with an embodiment of the present invention, the link pins 26 and 27 may be fixed to the block main body 15. Further, in a case that the link pins 26 and 27 are turnable with respect to the block main body 15, the link pins 26 and 27 may be fixed to the link members 23.

A torsion coil spring 10 and a spring engaging projection 15c are disposed between the two fixed pins 22 and disposed between the two link pins 26 and 27 in the front and rear direction. Therefore, in this modified embodiment, in comparison with a case that the torsion coil spring 10 and the spring engaging projection 15c are disposed on a front side with respect to the fixed pin 22 and the link pin 26 which are disposed on a front side, or disposed on a rear side with respect to the fixed pin 22 and the link pin 27 which are disposed on a rear side, a size of the card reader 1 can be reduced in the front and rear direction. Accordingly, similarly to the embodiment described above, a size of the card reader 1 can be further reduced in the front and rear direction.

Further, in this modified embodiment, the torsion coil spring 10 and the spring engaging projection 15c are disposed between the two fixed pins 22 and between the two link pins 26 and 27 in the front and rear direction and thus, also in this modified embodiment, the IC contact block 9 urged by the torsion coil spring 10 is easily and smoothly moved between the retreated position 9B and the contact position 9A.

Other Embodiments

Although the present invention has been shown and described with reference to a specific embodiment, various changes and modifications will be apparent to those skilled in the art from the teachings herein.

In the embodiment described above, the spring engaging projection 15c may be disposed on a front side with respect to the first contact part 7a, or may be disposed on a rear side with respect to the second contact part 8a. Further, in the embodiment described above, the torsion coil spring 10 and the spring engaging projection 15c may be disposed on a front side with respect to the cam groove 11a and the cam pin 16, or may be disposed on a rear side with respect to the cam groove 11b and the cam pin 17. Further, in the modified embodiment shown in FIGS. 5A and 5B, the torsion coil spring 10 and the spring engaging projection 15c may be disposed on a front side with respect to the fixed pin 22 and the link pin 26, or may be disposed on a rear side with respect to the fixed pin 22 and the link pin 27.

In the embodiment described above, the shapes of the cam grooves 11a and 11b when viewed in the right and left direction may be formed in a curved shape other than a circular arc shape, or may be formed in a straight line shape which is inclined toward an upper side as going toward a front side. Further, in the embodiment described above, the cam groove 11a is not required to penetrate through the cam groove forming part 11c in the right and left direction. Specifically, the cam grooves 11a may be recessed parts which are recessed from inner side faces in the right and left direction of the cam groove forming parts 11c toward outer sides in the right and left direction. Similarly, the cam groove 11b is not required to penetrate through the cam groove forming part 11d in the right and left direction.

In the embodiment described above, the spring engaging projection 15c may be formed in a pillar shape other than a circular columnar shape. In the embodiment described above, the block side spring engaging part with which one end part of the torsion coil spring 10 is engaged is not required to be formed in a protruded part. In the embodiment described above, the card reader 1 is a manual type card reader. However, the card reader 1 may be a card conveyance type card reader having a card conveyance mechanism structured to automatically convey a card 2. In this case, a card conveyance passage corresponding to the card moving passage 3 is formed in an inside of the card reader 1. In the embodiment described above, a PET (polyethylene terephthalate) card whose thickness is about 0.18-0.36 mm, a paper card having a predetermined thickness or the like may be processed in the card reader 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:

a plurality of IC contact springs structured to contact with an external connection terminal of an IC chip formed in a card;

an IC contact block which holds the plurality of the IC contact springs;

a main body frame in which a card moving passage for moving the card is formed; and a torsion coil spring which urges the IC contact block to the main body frame;

wherein when one side in a moving direction of the card which is linearly moved in the card moving passage is referred to as a rear side, and one side in a thickness direction of the card which is linearly moved in the card moving passage is referred to as a first direction side, the IC contact block comprises a card abutting part which is formed with a card abutting face for abutting with an end face on the rear side of the card, and a block side spring engaging part with which one end part of the torsion coil spring is engaged;

the IC contact block is movable with respect to the main body frame between a contact position where the IC contact springs are capable of contacting with the external connection terminal and a retreated position where the IC contact springs are retreated to a position at which the IC contact springs are not contacted with the external connection terminal;

the main body frame comprises a frame side spring engaging part with which an other end part of the torsion coil spring is engaged;

the torsion coil spring urges the IC contact block toward the retreated position;

when the IC contact block is pushed toward the rear side by the card which is abutted with the card abutting face, the IC contact block is moved from the retreated position toward the contact position, and the IC contact block moved toward the contact position from the retreated position is moved toward the first direction side as moving toward the rear side;

the main body frame is formed with a cam groove for guiding the IC contact block between the contact position and the retreated position;

the IC contact block comprises a cam pin which is engaged with the cam groove and guides the IC contact block between the contact position and the retreated position;

the IC contact block comprises a first cam pin and a second cam pin as the cam pin;

the first cam pin and the second cam pin are disposed in a separated state from each other in the moving direction of the card;

the main body frame is formed with, as the cam groove, a first cam groove with which the first cam pin is engaged and a second cam groove with which the second cam pin is engaged, the torsion coil spring is disposed between the first cam groove and the second cam groove in the moving direction of the card; and the block side spring engaging part is disposed between the first cam pin and the second cam pin in the moving direction of the card.

2. The card reader according to claim 1, wherein a shape of the cam groove is a circular arc shape when viewed in a width direction of the card which is perpendicular to the moving direction of the card and the thickness direction of the card.

3. The card reader according to claim 1, wherein a shape of the first cam groove and a shape of the second cam groove when viewed in a width direction of the card which is perpendicular to the moving direction of the card and the thickness direction of the card are circular arc shapes which are same shapes as each other.

4. A card reader comprising:

a plurality of IC contact springs structured to contact with an external connection terminal of an IC chip formed in a card;

an IC contact block which holds the plurality of the IC contact springs;

a main body frame in which a card moving passage for moving the card is formed; and a torsion coil spring which urges the IC contact block to the main body frame;

wherein when one side in a moving direction of the card which is linearly moved in the card moving passage is referred to as a rear side, and one side in a thickness direction of the card which is linearly moved in the card moving passage is referred to as a first direction side, the IC contact block comprises a card abutting part which is formed with a card abutting face for abutting with an end face on the rear side of the card, and a block side spring engaging part with which one end part of the torsion coil spring is engaged;

the IC contact block is movable with respect to the main body frame between a contact position where the IC contact springs are capable of contacting with the external connection terminal and a retreated position where the IC contact springs are retreated to a position at which the IC contact springs are not contacted with the external connection terminal;

the main body frame comprises a frame side spring engaging part with which an other end part of the torsion coil spring is engaged;

the torsion coil spring urges the IC contact block toward the retreated position;

when the IC contact block is pushed toward the rear side by the card which is abutted with the card abutting face, the IC contact block is moved from the retreated position toward the contact position, and the IC contact block moved toward the contact position from the retreated position is moved toward the first direction side as moving toward the rear side;

two fixed pins which are attached to the main body frame; and two link members which are turnable with a width direction of the card as an axial direction of turning and with the fixed pin as a turning center, the width direction of the card being a direction perpendicular to the moving direction of the card and the thickness direction of the card;

wherein the two fixed pins are disposed in a separated state from each other in the moving direction of the card;

the two link members are disposed in a separated state from each other in the moving direction of the card;

the IC contact block comprises two link pins which are turnably held by the link member or fixed to the link member;

the two fixed pins, the two link members and the two link pins structure a parallel link mechanism for guiding the IC contact block between the contact position and the retreated position;

the torsion coil spring is disposed between the two fixed pins in the moving direction of the card; and the block side spring engaging part is disposed between the two link pins in the moving direction of the card.

5. The card reader according to claim 1, wherein the plurality of the IC contact springs comprises:

a plurality of first IC contact springs disposed at same positions in the moving direction of the card; and a plurality of second IC contact springs which are disposed at same positions in the moving direction of the card and disposed on the rear side with respect to the first IC contact springs, and the block side spring engaging part is disposed in the moving direction of the card between a first contact part of the first IC contact spring which is a portion to be contacted with the external connection terminal and a second contact part of the second IC contact spring which is a portion to be contacted with the external connection terminal.

6. The card reader according to claim 4, wherein the plurality of the IC contact springs comprises:

a plurality of first IC contact springs disposed at same positions in the moving direction of the card; and a plurality of second IC contact springs which are disposed at same positions in the moving direction of the card and disposed on the rear side with respect to the first IC contact springs, and the block side spring engaging part is disposed in the moving direction of the card between a first contact part of the first IC contact spring which is a portion to be contacted with the external connection terminal and a second contact part of the second IC contact spring which is a portion to be contacted with the external connection terminal.

7. The card reader according to claim 4, wherein the main body frame is formed with a cam groove for guiding the IC contact block between the contact position and the retreated position, and the IC contact block comprises a cam pin which is engaged with the cam groove and guides the IC contact block between the contact position and the retreated position.

8. The card reader according to claim 7, wherein the IC contact block comprises a first cam pin and a second cam pin as the cam pin, the first cam pin and the second cam pin are disposed in a separated state from each other in the moving direction of the card, the main body frame is formed with, as the cam groove, a first cam groove with which the first cam pin is engaged and a second cam groove with which the second cam pin is engaged, the torsion coil spring is disposed between the first cam groove and the second cam groove in the moving direction of the card, and the block side spring engaging part is disposed between the first cam pin and the second cam pin in the moving direction of the card.

\* \* \* \* \*